(12) United States Patent
Mitchell et al.

(10) Patent No.: US 10,272,377 B2
(45) Date of Patent: Apr. 30, 2019

(54) GAS COMPRESSOR FILTER ELEMENT

(71) Applicant: Ingersoll-Rand Company, Davidson, NC (US)

(72) Inventors: Stephen Andrew Mitchell, Concord, NC (US); Michael Borkowski, Concord, NC (US); George Mankos, Davidson, NC (US)

(73) Assignee: Ingersoll-Rand Company, Davidson, NC (US)

( * ) Notice: Subject to any disclaimer, the term of this patent is extended or adjusted under 35 U.S.C. 154(b) by 34 days.

(21) Appl. No.: 15/392,180

(22) Filed: Dec. 28, 2016

(65) Prior Publication Data

US 2018/0178152 A1 Jun. 28, 2018

(51) Int. Cl.
*B01D 46/00* (2006.01)
*B01D 46/24* (2006.01)

(52) U.S. Cl.
CPC ..... *B01D 46/0005* (2013.01); *B01D 46/0031* (2013.01); *B01D 46/2411* (2013.01)

(58) Field of Classification Search
CPC B01D 46/00; B01D 46/0005; B01D 46/0031; B01D 46/2411
USPC .......................................................... 55/423
See application file for complete search history.

(56) References Cited

U.S. PATENT DOCUMENTS

| | | | |
|---|---|---|---|
| 3,811,251 A | 5/1974 | Gibel | |
| 4,160,684 A | 7/1979 | Berger, Jr. et al. | |
| 4,233,042 A | 11/1980 | Tao | |
| 4,721,563 A | 1/1988 | Rosaen | |
| 5,676,717 A | 10/1997 | Cope et al. | |
| 6,136,076 A | 10/2000 | Read | |
| 6,387,142 B1 * | 5/2002 | Pieciak | B01D 29/21 55/360 |
| 6,500,243 B2 | 12/2002 | Cook et al. | |
| 6,797,025 B2 | 9/2004 | Linnersten et al. | |
| 7,056,362 B2 | 6/2006 | Fallows et al. | |
| 7,579,863 B2 | 8/2009 | Yeh | |
| 7,588,615 B2 | 9/2009 | Gillenberg et al. | |
| 8,333,818 B2 | 12/2012 | Foerster et al. | |
| 8,858,669 B2 | 10/2014 | Gardner | |
| 9,339,750 B2 | 5/2016 | Eberle | |
| 2004/0000236 A1 | 1/2004 | Linnersten et al. | |
| 2016/0121250 A1 | 5/2016 | Dworatzek et al. | |

FOREIGN PATENT DOCUMENTS

| | | |
|---|---|---|
| JP | 07217577 A | 8/1995 |
| WO | 1999037386 A1 | 7/1999 |

OTHER PUBLICATIONS

Extended European Search Report, European Patent Application No. 17210007.5, dated May 16, 2018, 9 pages.

* cited by examiner

*Primary Examiner* — T. Bennett McKenzie
(74) *Attorney, Agent, or Firm* — Taft Stettinius & Hollister LLP (57) ABSTRACT

A filter element for use in a gas compression system is disclosed and is structured to filter a lubricant mist from a flow of compressed gas. The filter element includes a lip and a separator flange that extends from the lip in a generally downward direction to a basket. The basket can contain a filter media useful to remove lubricant mist from the flow of compressed gas. The separator flange is oriented in a downward direction to encourage condensate to flow toward the basket and away from a lid of a container in which the filter element is installed.

9 Claims, 9 Drawing Sheets

GAS COMPRESSOR FILTER ELEMENT

TECHNICAL FIELD

The present invention generally relates to filter elements useful to remove a lubricant mist from a flow of compressed gas, and more particularly, but not exclusively, to air compressor filter elements.

BACKGROUND

Channeling condensate buildup resulting from a gas compression process remains an area of interest. Some existing systems have various shortcomings relative to certain applications. Accordingly, there remains a need for further contributions in this area of technology.

SUMMARY

One embodiment of the present invention is a unique gas compressor filter element. Other embodiments include apparatuses, systems, devices, hardware, methods, and combinations for filtering compressed gas. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
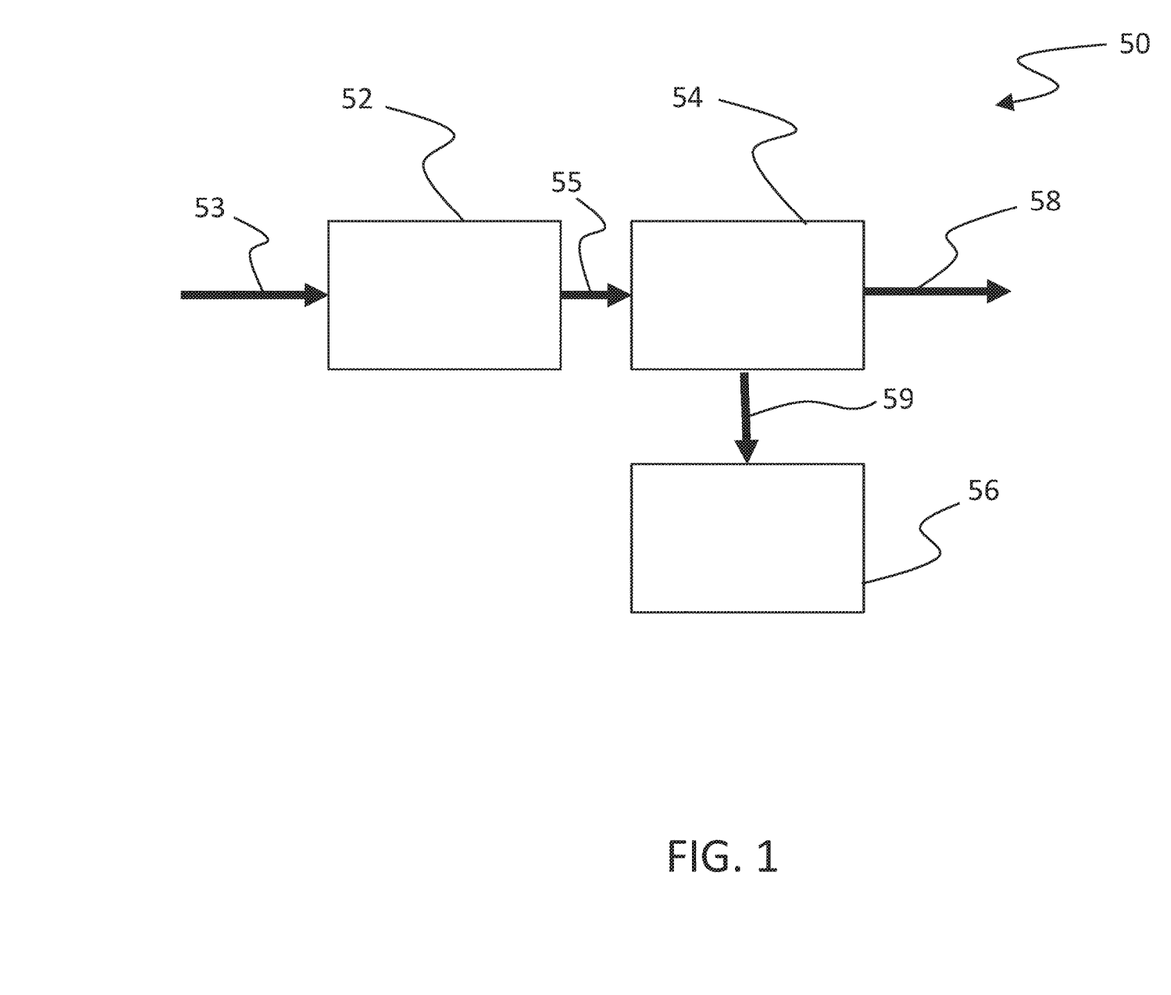
FIG. 1 depicts an embodiment of a gas compressor having a filter element.
Figure 2:
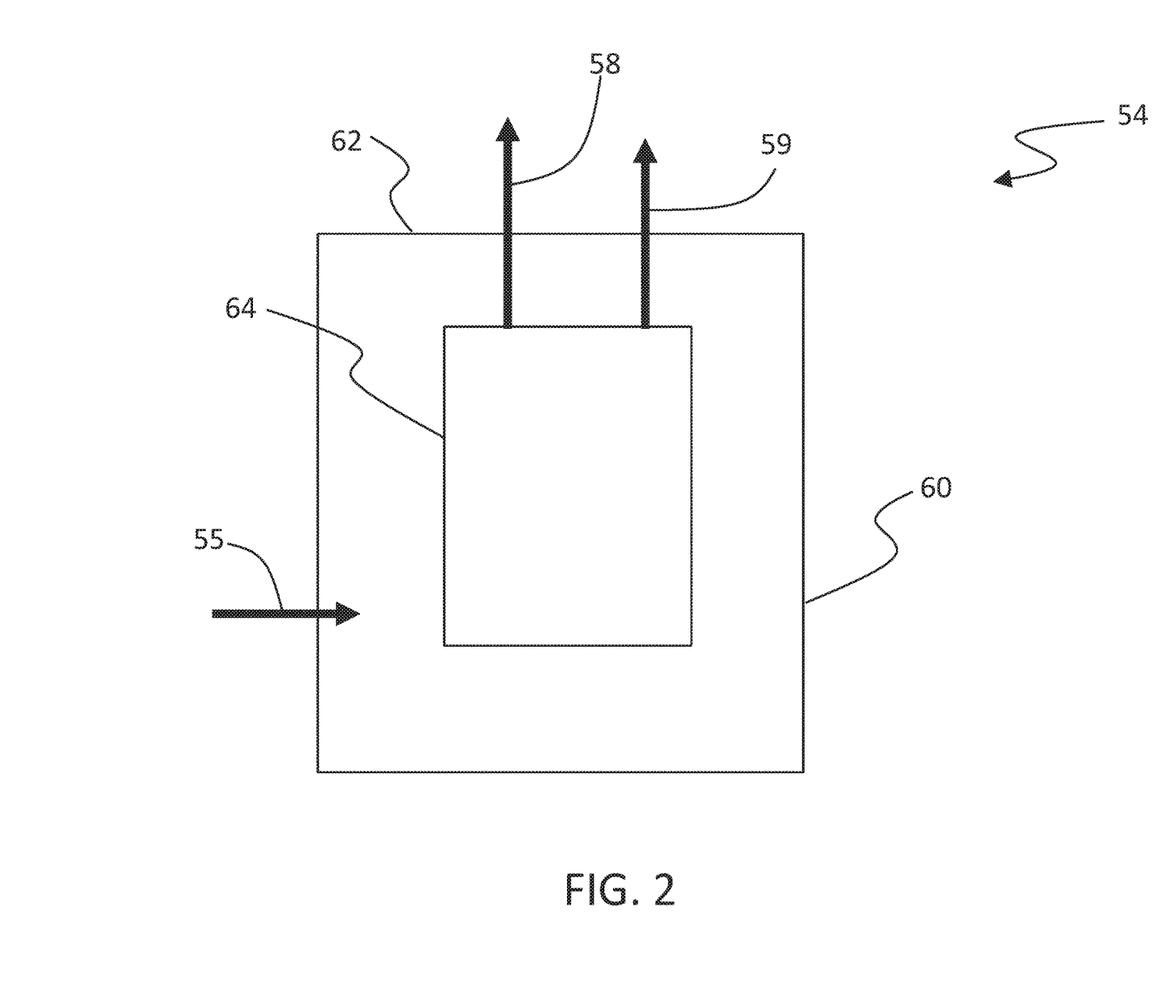
FIG. 2 depicts an embodiment of a container within which is located a filter element.

With reference to FIG. 1, a compressor system 50 is disclosed which includes a compressor 52 capable of receiving a working fluid 53, such as but not limited to air, and compressing the working fluid to produce an outflow of compressed gas. The compressor 52 can be a contact cooled lubricant flooded rotary compressor such as, but not limited to, a screw compressor. The compressor 52 is capable of producing a mixed outflow of compressed gas and lubricant mist 55 (hereafter referred to as an oil mist for sake of brevity, but other lubricants/coolants can also be used) that is the byproduct of the compression process via the type of compressor used. The mixed outflow is provided to a filter 54 which is structured to remove oil mist from the mixed outflow from the compressor 52 to produce a flow of compressed gas 58 (which may or may not contain oil remainders). Lubricant or coolant (e.g. oil) that is filtered from the mixed stream provided by the compressor 52 can be delivered via 59 to a container such as, but not limited to the reservoir 56. Such a container 56 can be part of the compressor 52 useful in recycling the lubricant/coolant, or the container 56 can be a separate component entirely.

Turing now to FIGS. 2-6, one embodiment of the filter 54 is illustrated which includes a container 60 having a lid 62 which can be opened and closed to access a filter element 64. The filter element 64 is structured to receive the mixed flow of compressed gas and lubricant 55 and separate the lubricant from compressed gas. The filtered compressed gas outflow 58 can be used by a downstream customer, while lubricant can be recovered via 59 as a result of the filtering.

Figure 3:
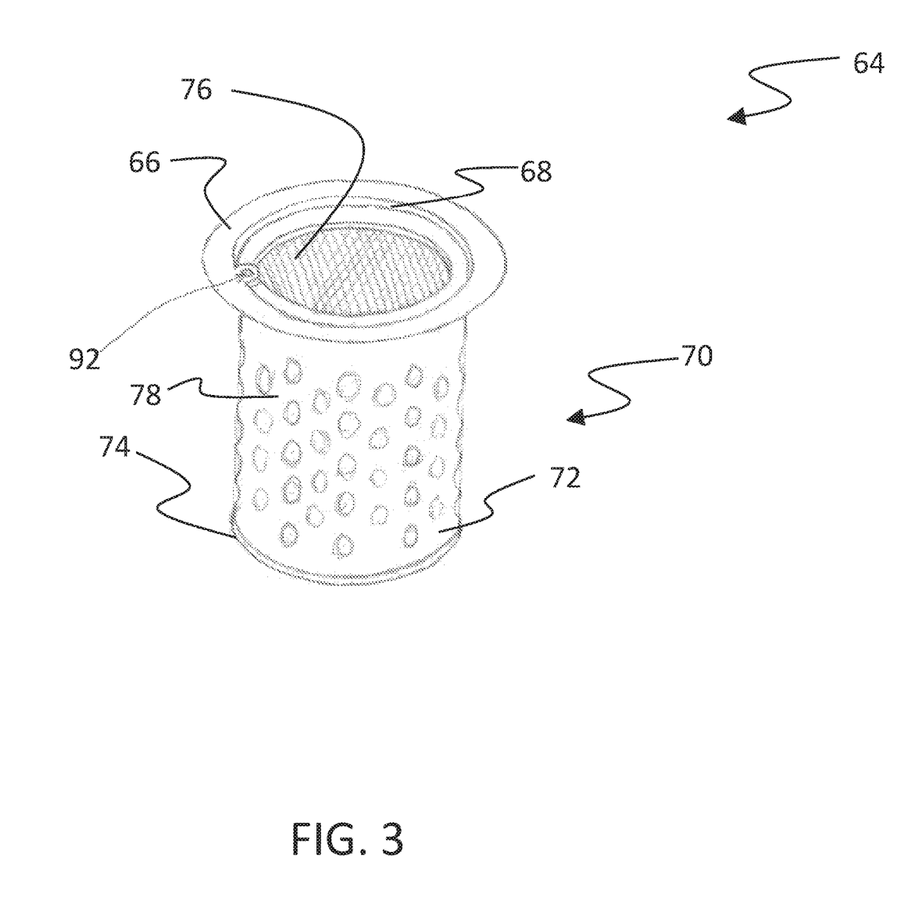
FIG. 3 depicts an embodiment of a filter element.

One embodiment of the filter element 64 can be seen in FIG. 3. The filter element 64 includes a lip 66, separator element flange 68, and a basket 70. A portion of the lip 66 is captured by the lid 62 of the compressor filter container 60. Such a capture is used to secure the filter element 64 in place but to also provide a support mechanism for the element 64. In some embodiments the lip 66 can extend around the entire periphery of the element 64.

The lip 66 can be located in a plane to facilitate its capture by the lid 62. In some forms the lip 66 need include only a portion, or multiple distinct portions in the same plane. In either of these cases, the lip 66 includes a portion whether it is all or a smaller subdivision located in the plane.

The lip 66 is generally oriented transverse to the exterior surface 72 of the basket 70. Such transverse arrangement can be at a 90 degree angle, but other embodiments may include angles greater than or less than 90 degrees at one or more portions around the periphery of the filter element 64.

The lip 66 can extend around a periphery of the filter element 64. For example, the lip 66 can circumferentially extend around the periphery, where the term "circumferentially" will be understood to be extending in the circumferential direction, whether or not the surface extends around the entirety of the perimeter of the open interior of the canister.

The lip 66 can be connected to the separator flange, where such connection will be understood to be a natural result of a monolithic construction, but also the result of an assembly integration in which separate components are joined to each other (via any variety of techniques including mechanical (e.g. fasteners), metallurgical (e.g. welding), chemical (e.g. bonding), etc). In one embodiment the lip and separator flange can be stamped in one action.

Figure 6:
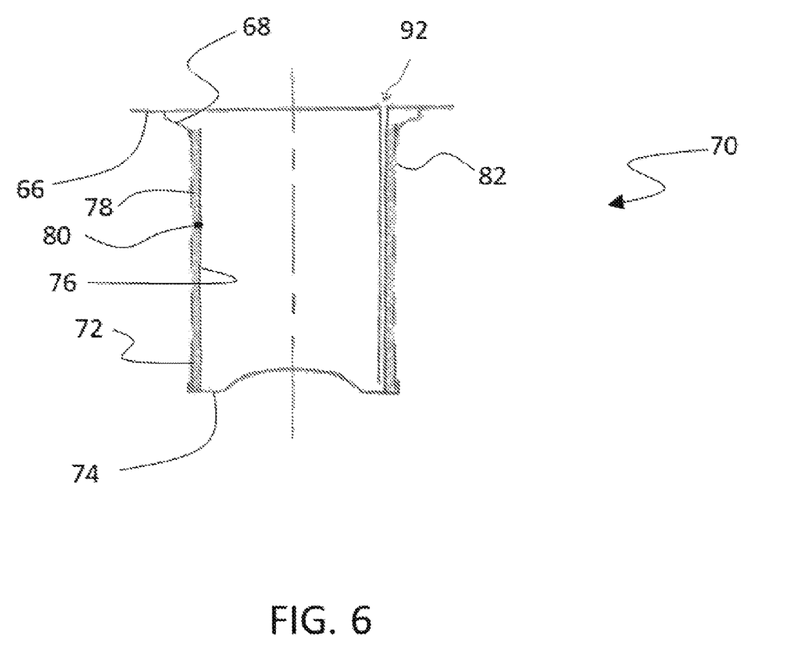
FIG. 6 depicts an embodiment of a filter element.

As best seen in FIG. 6, the lip 66 can be located proximate to an axial end of the exterior 72 of the basket 70. In some embodiments, the lip 66 can extend from locations that are not exact to the axial end of the basket. As can be seen in the nonlimiting illustrated embodiment, some axial distance can be provided between the lip 66 and an axial end of the basket 70, a distance which can be provided by the sloped separator element flange 68. In one form the separator element flange 68 generally begins at height of the lip 66 and continues generally downward until it intersects with the exterior surface of the basket, but other variations are also contemplated as to the precise coupled nature of the flange 68 to the basket 70.

The separator element flange 68 is sloped in its entirety, or at least in one or more portions, to encourage moisture/condensate/etc that collects on or near the lid 66 to flow toward the basket 70. Such condensate or moisture can be water that forms from a cooled water vapor that is carried by the compressed gas as a result of the compression process. The separator element flange 68 includes a flow path that permits fluid to drain down from a location at or near the lip into the interior of the basket. The flow path can be any shape and size, and can include multiple flow paths in some embodiments. Such multiple flow paths can be separate and distinct, and in some forms can include one or more flow paths that merge before exiting into the interior of the basket.

The separator element flange 68 can be sloped in any variety of manners. In one form the separator element flange 68 slopes monotonically from the lid 66 to the basket 70. As used herein, "monotonic" includes those surfaces that progresses in a given direction, such as being entirely nonincreasing from the lid 66 to the basket 70. In another nonlimiting form the separator element flange 68 can be sloped any angle, whether the angle is constant across the entirety of the flange 68, or varies by section. In yet another form, the sloped surface can include a surface without an inflection point in that it does not fold back on itself before returning in a general downward direction to the exterior surface of the basket. The flange also be curvilinear, such as but not limited to concave or convex. In still other forms, the flange can also be conical. Such conical shape can be a frustoconical shape, whether upright or oriented such that the general shape is leaned in one direction. Other variations are also contemplated.

The basket 70 can be formed apart from the filter media, but in some forms the basket can be considered the assembled components that, in the aggregate, form a basket 70 such as would be generally appreciated. As used herein, a basket generally will be understood as those types of containers with an open top, closed bottom, and open interior. The basket 70 can take on a variety of forms. For example, the basket 70 can include a bottom end cap 74, inner wall 76, outer wall 78, and a filter media 80, but other configurations may only include an end cap 74 along with the outer wall 78 alone, or perhaps outer 78 and inner walls 76, prior to introduction of the filter media 80. Any of the end cap 74, inner wall 76 and outer wall 78 can be separately made and later assembled to form a completed basket 70. Such assembly can be through a variety of manners, such as mechanical, metallurgical, or chemical.

The basket 70 can be any suitable shape to contain a filter media. In one nonlimiting form the basket is circular in shape into which can be inserted a circular shaped filter media, but other shapes of either or both the interior of the basket and the filter media shape are also contemplated.

The inner wall 76 and/or outer wall 78 can be made in a variety of manners, from a variety of materials. For example, one or both of the inner wall 76 and outer wall 78 can be formed by rolling a strip of sheet stock into a cylinder and affixing the ends of the strip together. Such affixation can be via fastening, bonding, welding, etc. The bottom end cap 74 can be affixed in similar manner. In some forms the inner wall 76 and outer wall 78 are the same in configuration, but not all embodiments need include identical configurations. Either or both the outer wall 78 and inner wall 76 can include a number of holes that are stamped or cut in place, while in other forms either or both the outer wall 78 and the inner wall 76 can be made from a mesh construction, where such mesh construction can include a woven construction, stamped construction, or layered construction, among many others. The openings formed in either the outer wall 78 or inner wall 76 can therefore be holes, mesh openings, etc. Any number of openings having any aggregate cross sectional size and can be The exterior shell 78 can take on many forms, and includes at least one opening 82 through which oil mist and compressed air are passed. The openings can be perforations in one form, and can take on any variety of shapes and sizes suitable to permit a mixture of compressed gas and lubricant mist to pass, and can be arranged in any configuration. In one form the openings 82 can be circular in nature, and in some forms (e.g. the illustrated embodiment) can be regularly spaced, but such regular spacing is not required.

The filter media 80 and/or one or more of the retention elements 76 and 78 around the filter media are structured to withstand the pressure differential across the filter media when in operation such that the media 80 remains substantially in place and intact. It will be appreciated that in the absence of sufficient structural arrangements a filter media 80 and/or retention elements 76/78 not adapted for a compressed air system will not be sufficient and cannot be used within a compressed air system.

The filter media 80 can be constructed using any variety of materials suitable for use in a compressor environment to filter lubricant mist from a compressed gas. In one form the filter media 80 is made of a paper construction, but other types of media are also contemplated.

In the illustrated embodiment the top of filter media 80 is below plane in which the lip 66 resides. In one embodiment, such as that depicted in the figures, the downward sloping flange does not reverse itself, and further does not reverse itself in sufficient measure to rise up and capture an end of the filter media, as shown in U.S. Pat. No. 9,339,750. The bottom of filter media 80 can be supported by the bottom end cap 74, but other configurations are also contemplated. In those forms in which the filter media is captured by an inner and outer structure, the structure itself, and/or the filter media, can be supported by the bottom end cap 74.

One or more of the lip 66, separator element flange 68, and the basket 70 can be formed as an integral component. The term integral can include monolithic construction (e.g. stamped or cast component)) as well as integrated components made from bringing together through fastening/bonding/etc separate components. To set forth just one nonlimiting example, in a stamped construction the filter element can include locally yielded regions of material (e.g. corners) that are formed in place as a result of a stamping operation, with larger substantially unyielded material construction between the locally yielded regions. It is contemplated that the lip 66 and/or separator element flange 68 and/or end cap 74 can be a stamped construction, but other alternatives are likewise contemplated.

Figure 4:
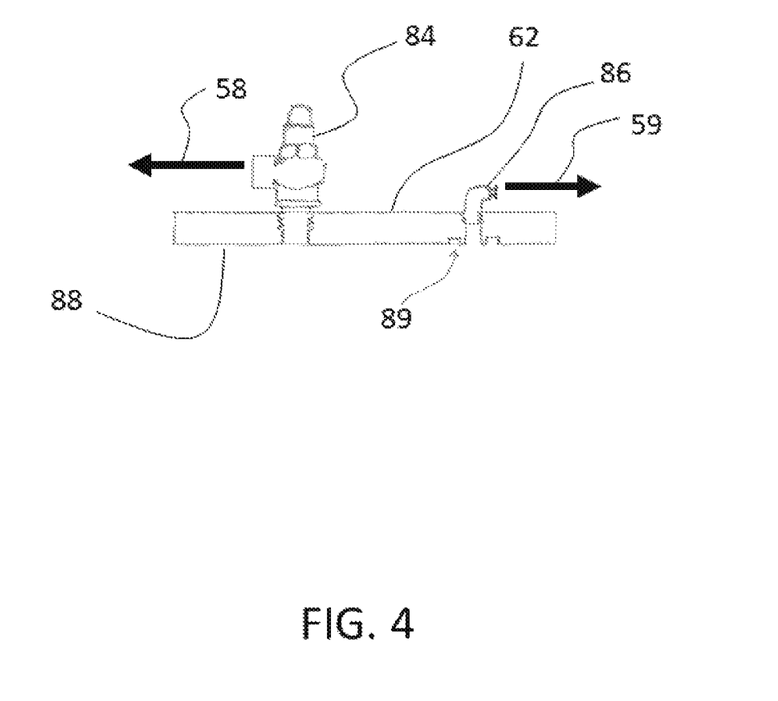
FIG. 4 depicts an embodiment of a lid for use with a filter container of a gas compressor.

Turning now specifically to FIG. 4, one embodiment of the lid 62 is illustrated which includes a compressed gas fitting 84 for conveyance of a compressed gas from the container 60 and a scavenge pipe fitting 86 (see below with respect to FIGS. 6 and 7) for conveyance of lubricant. One or both of the fittings 84 and 86 can be valves in some embodiments. A bottom 88 of the lid 62 can be used to contact the lip 66 of the filter element 64. The bottom 88 can also include grooves 89 to permit a seal, such as an O-ring, to be used.

Figure 5:
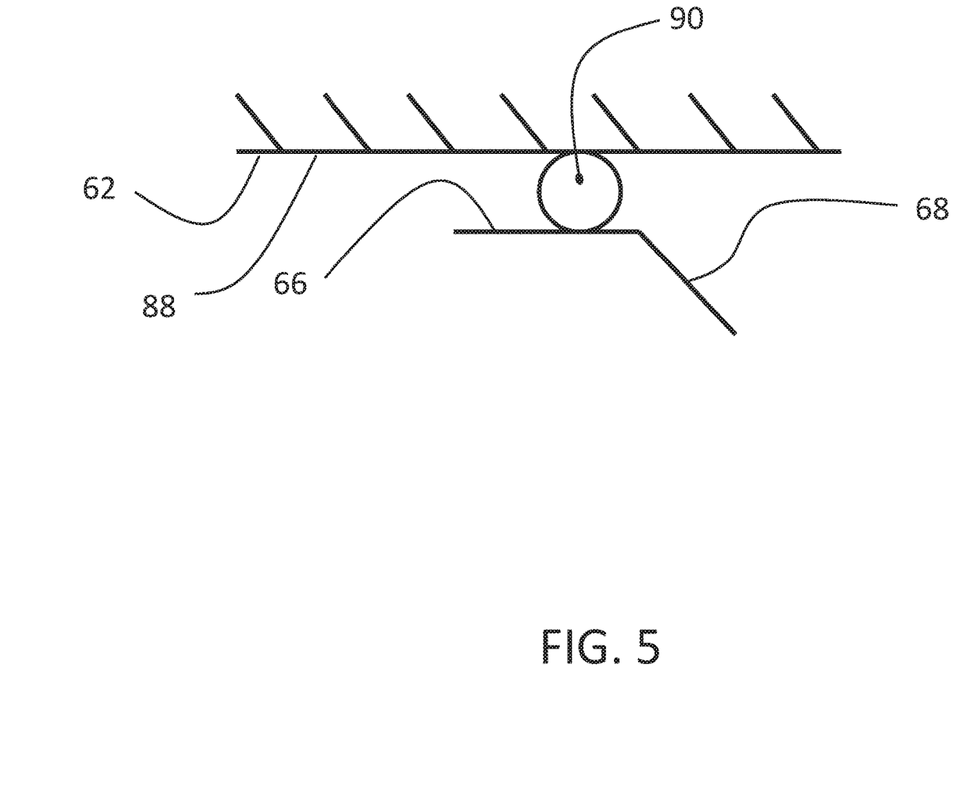
FIG. 5 depicts an embodiment of an engagement between a filter element lip and container lid.

FIG. 5 illustrates a nonlimiting embodiment of an engagement of the lid 62 with the lip 66 via a seal 90 to secure the filter element 64 in place within the container 60. Not shown is a static component which supports the filter element 64 on another side to allow the element to be secured with the lid 62. Such a static component can be located on an opposite side of the lip 66, but can be located elsewhere such as, but not limited to, the bottom of the filter element 64.

The seal 90 can be any suitable seal for a compressed gas and lubricant environment. The seal 90 can be made from a variety of materials and can take on a variety of shapes. In one nonlimiting form the seal 90 can be a gasket or O-ring.

As might be appreciated in FIG. 5, in some embodiments it can be desirable to minimize the amount of lip 66 that extends inward toward the separator element flange 68 from the seal 90 so that moisture collection on a flat surface is minimized.

FIGS. 3 and 6 depict an embodiment of the filter element 64 which includes a scavenge pipe 92. The scavenge pipe extends from a bottom of the basket 70 and is used to convey lubricant that has pooled in the bottom of the basket 70. In one form the scavenge pipe 92 can include an exit at the top of the filter element 64 which, when contacted by the lid 62, provides a sufficient fluid seal to allow extraction of lubricant from the filter element 64. As shown in the illustrated embodiment in FIG. 6, the filter media 80 is captured between the outer wall 78 and the scavenge pipe 92.

Figure 7:
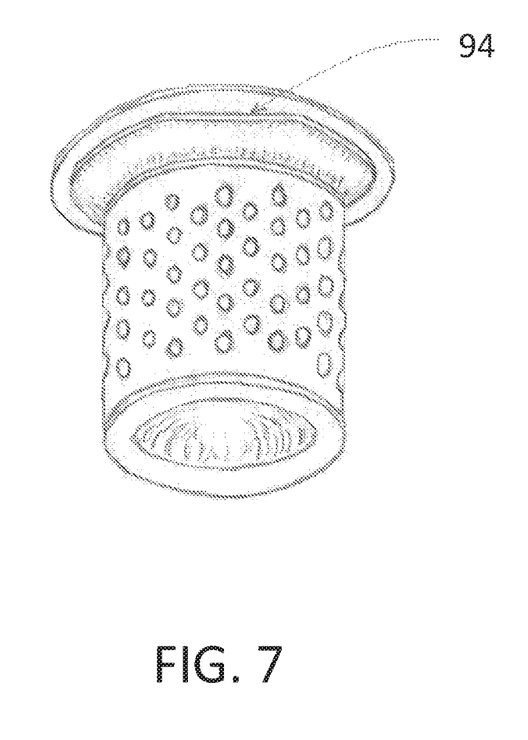
FIG. 7 depicts an embodiment of a filter element.
Figure 8:
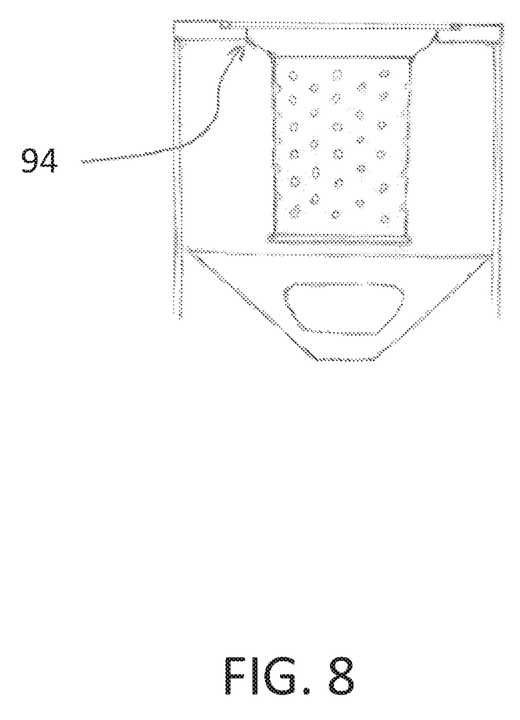
FIG. 8 depicts an embodiment of a filter element.
Figure 9:
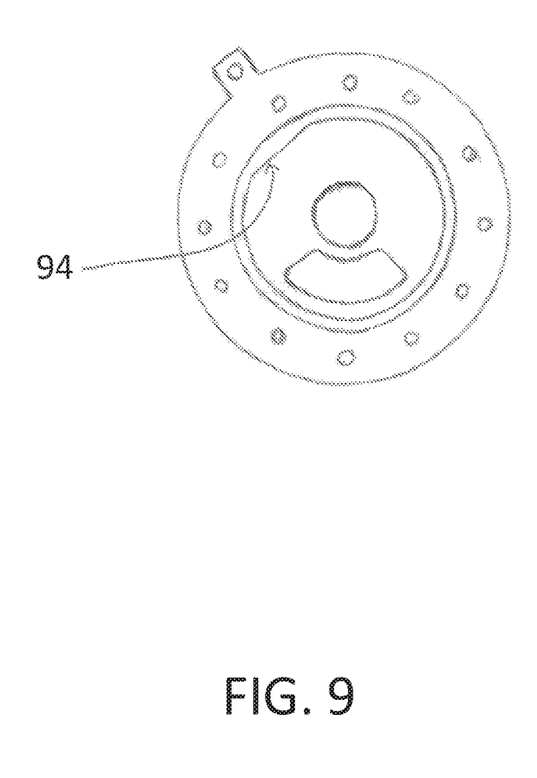
FIG. 9 depicts an embodiment of a filter element.

FIGS. 7-9 depict an embodiment of the filter element 64 which includes a registration surface 94 formed in the filter element 64. The registration surface 94 engages a registration surface in the container 60 such as to position the filter element 64. In the illustrated form the registration surface 94 can be a flat surface, such as a bevel, but other forms are also contemplated. The registration surface can be formed in the separator element flange 68, but other locations are also contemplated. One or more registration surfaces can be formed in the separator element 64.

One aspect of the present application includes an apparatus comprising a removable air compressor filter element having a basket with an end of an open interior into which a filter media can be inserted and an exterior shell structured to support the filter media, the exterior shell having an exterior surface including at least one opening through which a mixture of compressed gas and oil mist is allowed to traverse into the filter media, the removable air compressor filter element further including a support lip located proximate to an end of the basket and extending transverse to and away from the exterior surface of the basket, and a separator element flange that connects the support lip to the exterior surface of the basket, the separator element flange having a first side that faces toward the open interior and an opposing second side that points away from the open interior, the separator element flange also oriented at an angle to both the support lip and the exterior surface of the basket and structured to permit a liquid condensate forming on the first side of the separator element to flow into the open interior of the basket.

A feature of the present application includes wherein the separator element flange is conical shaped.

Another feature of the present application further includes a fluid conduit that extends from a bottom of the open interior and is structured to remove liquid from the basket.

Still another feature of the present application includes wherein the filter media resided between the exterior surface and the fluid conduit.

Yet another feature of the present application includes wherein the support lid and the separator element flange are a monolithic stamped construction.

Still yet another feature of the present application further includes a plurality of openings in the exterior surface of the removable air compressor filter element, the plurality of openings structured to place an interior surface of the basket in fluid communication with the exterior surface, and which further includes a filter media structured to remove oil mist.

Yet still another feature of the present application further includes a container into which the removable air compressor filter element is inserted, the container including a lid structured to engage the support lip of the removable air compressor filter element to retain the removable air compressor filter element in place.

A further feature of the present application includes an oil-filled compressor, and wherein the separator element flange is monotonic in shape as it extends from the lip.

Another aspect of the present application includes an apparatus comprising a compressed air filter element configured to filter mixed stream of compressed gas and oil mist, the compressed air filter element having: a basket having an interior into which a filter media is located when installed, the basket including an exterior shell having a plurality of apertures into which flow the mixed stream of compressed gas and oil mist, a lip located at an end of the basket and structured to engage a lid of a filter container, the lip oriented transverse to the exterior shell of the basket and having a circumferentially extending surface around the interior of the basket and having a portion located in a plane of capture used to support the compressed air filter element when in an installed configuration, and a separator element flange coupled between the lip and the exterior shell, the separator element flange located entirely on one side of the plane in which is located the portion of the circumferentially extending surface of the lip, the separator element flange including a surface forming a flow path that descends from the lip to the interior of the basket such that a liquid forming on the separator element flange is urged to flow into the interior of the basket.

A feature of the present application further includes a filter media captured between the exterior shell and an inner wall, the inner wall having a plurality of apertures from which flow a filtered compressed gas.

Another feature of the present application includes wherein the separator flange element extends away from the lip to the exterior shell without reversing direction and returning in direction toward the plane in which is located the circumferentially extending surface of the lip.

Still another feature of the present application includes wherein the basket includes a top and a bottom, the top including an open first end near the lip and the bottom including a closed second end, the compressed air filter element further including a fluid conduit which extends between the closed second end toward the open first end and structured to convey consolidated liquid located in the bottom of the basket toward the open first end.

Yet another feature of the present application further includes an air compressor and a conduit in fluid communication with the air compressor, the conduit connected to a container within which is disposed the compressed air filter element, the conduit structured to convey a mixed stream of oil mist and compressed air to be filtered by the filter media.

Still yet another feature of the present application includes wherein the container includes a lid which can be placed in an open position permitting insertion of the compressed air filter element and a closed position permitting filtering of the mixed stream of oil mist and compressed air, and which further includes a non-metallic sealer in intimate contact with the lid and the lip.

Yet still another feature of the present application includes wherein the separator element flange extends downwardly from the lip such that condensate forming on the separator element flange will be urged to flow toward the interior of the compressed air filter element.

A further feature of the present application includes wherein the separator element flange is directly connected between the lip and the exterior shell.

A still further feature of the present application includes wherein the inner wall is a wire mesh, and wherein the plurality of apertures are circular holes.

Still another feature of the present application includes a method comprising opening a lid of a compressed air filter container to expose an interior of the canister, inserting a replaceable filter element into the air filter canister, the replaceable filter element configured to remove oil mist from a stream of compressed gas, the replaceable filter element having a planar lip for registration within the container, a basket within which is retained a filter media, and a sloped separator element flange connecting the planar lip to the basket, the sloped separator element flange, closing the lid, and contacting a sealing member with and between the lid and the lip of the replaceable filter element.

A feature of the present application includes further includes aligning a registration surface in the replaceable filter element with a complementary registration surface in the air filter container.

Another feature of the present application includes wherein the aligning further includes abutting a stamped bevel in the replaceable filter element with a stepped surface in the container.

Still another feature of the present application further includes placing a container scavenger line in fluid communication with a scavenger tube in the replaceable filter element.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
 a compressed air filter element configured to filter mixed stream of compressed gas and oil mist, the compressed air filter element having:
  a basket having an interior into which a filter media is located when installed, the basket including an exterior shell having a plurality of apertures into which flow the mixed stream of compressed gas and oil mist;
  a lip located at an end of the basket and structured to engage a lid of a filter container, the lip oriented transverse to the exterior shell of the basket and having a circumferentially extending surface around the interior of the basket and having a portion located in a plane of capture used to support the compressed air filter element when in an installed configuration; and
  a separator element flange directly connected to the lip and to the exterior shell and not otherwise extending past the exterior shell, the separator element flange located entirely on one side of the plane in which is located the portion of the circumferentially extending surface of the lip, the separator element flange including a surface forming a flow path that descends from the lip to the interior of the basket such that a liquid forming on the separator element flange is urged to flow into the interior of the basket.

2. The apparatus of claim 1, which further includes a filter media captured between the exterior shell and an inner wall, the inner wall having a plurality of apertures from which flow a filtered compressed gas.

3. The apparatus of claim 2, wherein the separator flange element extends away from the lip to the exterior shell without reversing direction and returning in direction toward the plane in which is located the circumferentially extending surface of the lip.

4. The apparatus of claim 3, wherein the basket includes a top and a bottom, the top including an open first end proximate the lip and the bottom including a closed second end, the compressed air filter element further including a fluid conduit which extends between the closed second end toward the open first end and structured to convey consolidated liquid located in the bottom of the basket toward the open first end.

5. The apparatus of claim 4, which further includes an air compressor and a conduit in fluid communication with the air compressor, the conduit connected to a container within which is disposed the compressed air filter element, the conduit structured to convey a mixed stream of oil mist and compressed air to be filtered by the filter media.

6. The apparatus of claim 5, wherein the container includes a lid which can be placed in an open position permitting insertion of the compressed air filter element and a closed position permitting filtering of the mixed stream of oil mist and compressed air, and which further includes a non-metallic sealer in intimate contact with the lid and the lip.

7. The apparatus of claim 1, wherein the separator element flange extends downwardly from the lip such that condensate forming on the separator element flange will be urged to flow toward the interior of the compressed air filter element.

8. The apparatus of claim 7, wherein the separator element flange is directly connected between the lip and the exterior shell.

9. The apparatus of claim 8, wherein the inner wall is a wire mesh, and wherein the plurality of apertures are circular holes.

* * * * *